US011292375B1

(12) United States Patent
Nageshkar et al.

(10) Patent No.: US 11,292,375 B1
(45) Date of Patent: Apr. 5, 2022

(54) HEADREST ASSEMBLY

(71) Applicant: Ford Global Technologies, LLC, Dearborn, MI (US)

(72) Inventors: Vishal Vinayak Nageshkar, Farmington Hills, MI (US); Sangram Tamhankar, Canton, MI (US); Chaitanya Nimmagadda, Ypsilanti, MI (US); John Edward Huber, Novi, MI (US); Siddharthan Selvasekar, Livermore, CA (US); Patrick Maloney, Livonia, MI (US); Janice Lisa Tardiff, Plymouth, MI (US); Alex Perkins, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/093,690

(22) Filed: Nov. 10, 2020

(51) Int. Cl.
*B60N 2/888* (2018.01)
*B60N 2/809* (2018.01)
*B60N 2/879* (2018.01)

(52) U.S. Cl.
CPC ............ *B60N 2/888* (2018.02); *B60N 2/809* (2018.02); *B60N 2/879* (2018.02)

(58) Field of Classification Search
CPC ............................... B60N 2/888; B60N 2/879
See application file for complete search history.

(56) References Cited

U.S. PATENT DOCUMENTS

| | | | |
|---|---|---|---|
| 6,601,915 B2 | 8/2003 | Sullivan et al. | |
| 7,448,678 B2 | 11/2008 | Browne et al. | |
| 8,505,701 B2 | 8/2013 | Sella et al. | |
| 8,590,966 B2 | 11/2013 | Gaines et al. | |
| 9,387,784 B2 * | 7/2016 | Haga | B60N 2/806 |
| 9,511,695 B2 | 12/2016 | Okubo | |
| 9,746,048 B2 * | 8/2017 | Okubo | B60N 2/68 |
| 2005/0242637 A1 * | 11/2005 | Vitito | B60K 37/06 297/217.3 |
| 2006/0001307 A1 * | 1/2006 | Embach | B60R 7/043 297/391 |
| 2008/0211151 A1 | 9/2008 | Wieser et al. | |
| 2016/0121770 A1 * | 5/2016 | Takahashi | B60N 2/68 297/452.18 |
| 2016/0339816 A1 * | 11/2016 | Mizobata | B60N 2/80 |
| 2016/0368403 A1 * | 12/2016 | Kobayashi | B60N 2/80 |
| 2018/0312086 A1 * | 11/2018 | Meingast | B60N 2/7017 |
| 2019/0048960 A1 | 2/2019 | Roeda et al. | |

FOREIGN PATENT DOCUMENTS

| | | |
|---|---|---|
| DE | 10327711 A1 | 1/2005 |
| WO | 2015150437 A4 | 8/2015 |

\* cited by examiner

*Primary Examiner* — David R Dunn
*Assistant Examiner* — Tania Abraham
(74) *Attorney, Agent, or Firm* — Vichit Chea; Price Heneveld LLP

(57) ABSTRACT

A headrest assembly includes a headrest bun having an interior portion. A support armature includes a portion thereof disposed within the interior portion of the headrest bun. A support member includes a lattice matrix comprised of a plurality of interconnected links. The support member is supported within the interior portion of the headrest bun by the support armature. A receptacle is operably coupled to the lattice matrix of the support member within the interior portion of the headrest bun and includes an interior cavity. A weighted insert is removeably received within the interior cavity of the receptacle.

18 Claims, 7 Drawing Sheets

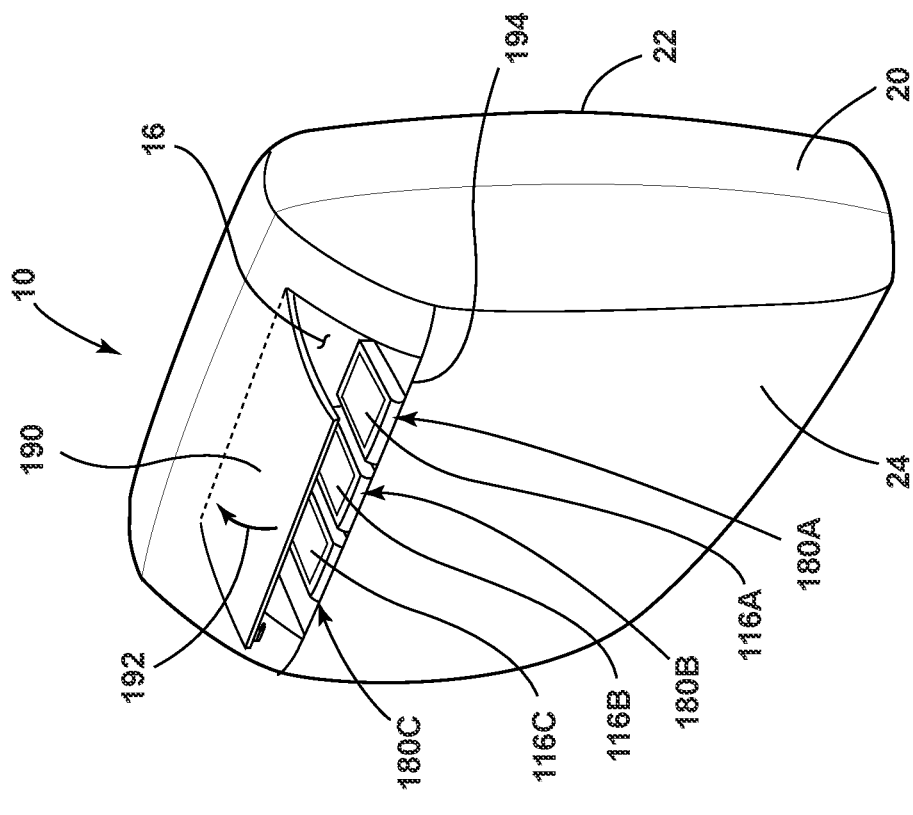
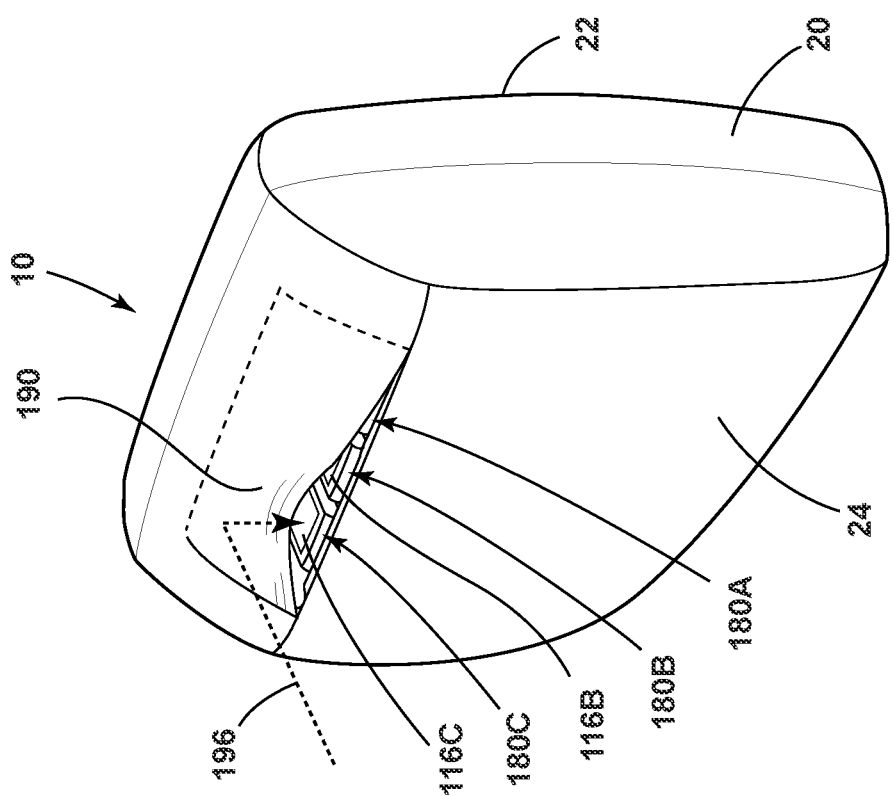
FIG. 9B
FIG. 9A

US 11,292,375 B1

HEADREST ASSEMBLY

FIELD OF THE DISCLOSURE

The present concept relates to a mass damper assembly, and more specifically, to a mass damper assembly disposed in a headrest assembly.

BACKGROUND OF THE DISCLOSURE

The present concept provides unique mass damper tuning to mitigate vibration.

SUMMARY OF THE DISCLOSURE

According to a first aspect of the present disclosure, a headrest assembly includes a headrest having an interior portion, and a support armature having a portion thereof disposed within the interior portion of the headrest bun. A support member includes a lattice matrix having a plurality of interconnected links. The support member is supported within the interior portion of the headrest bun by the support armature. A receptacle is operably coupled to the lattice matrix of the support member within the interior portion of the headrest bun and includes an interior cavity. An insert is removeably received within the interior cavity of the receptacle.

According to a second aspect of the present disclosure, a headrest assembly includes a headrest bun having an interior portion. A support armature includes a portion thereof disposed within the interior portion of the headrest bun. A receptacle is disposed within the interior portion of the headrest bun and operably coupled to the portion of the support armature disposed within the interior portion of the headrest bun. The receptacle includes an open top portion opening into an interior cavity. An insert is removeably received within the interior cavity of the receptacle.

According to a third aspect of the present disclosure, a headrest assembly includes a headrest bun having an interior portion. A plurality of resonators is disposed within the interior portion of the headrest bun. Each resonator of the plurality of resonators includes a receptacle operably coupled to a deflectable lattice matrix and an insert received within an interior cavity of the receptacle.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9A is a top perspective view of the headrest assembly of FIG. 8 showing a flap portion on an outer casing thereof; and FIG. 9B is a top perspective view of the headrest assembly of FIG. 9A showing the flap portion in an open position providing access the interior portion of a headrest bun.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

In this document, relational terms, such as first and second, top and bottom, and the like, are used solely to distinguish one entity or action from another entity or action, without necessarily requiring or implying any actual such relationship or order between such entities or actions.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
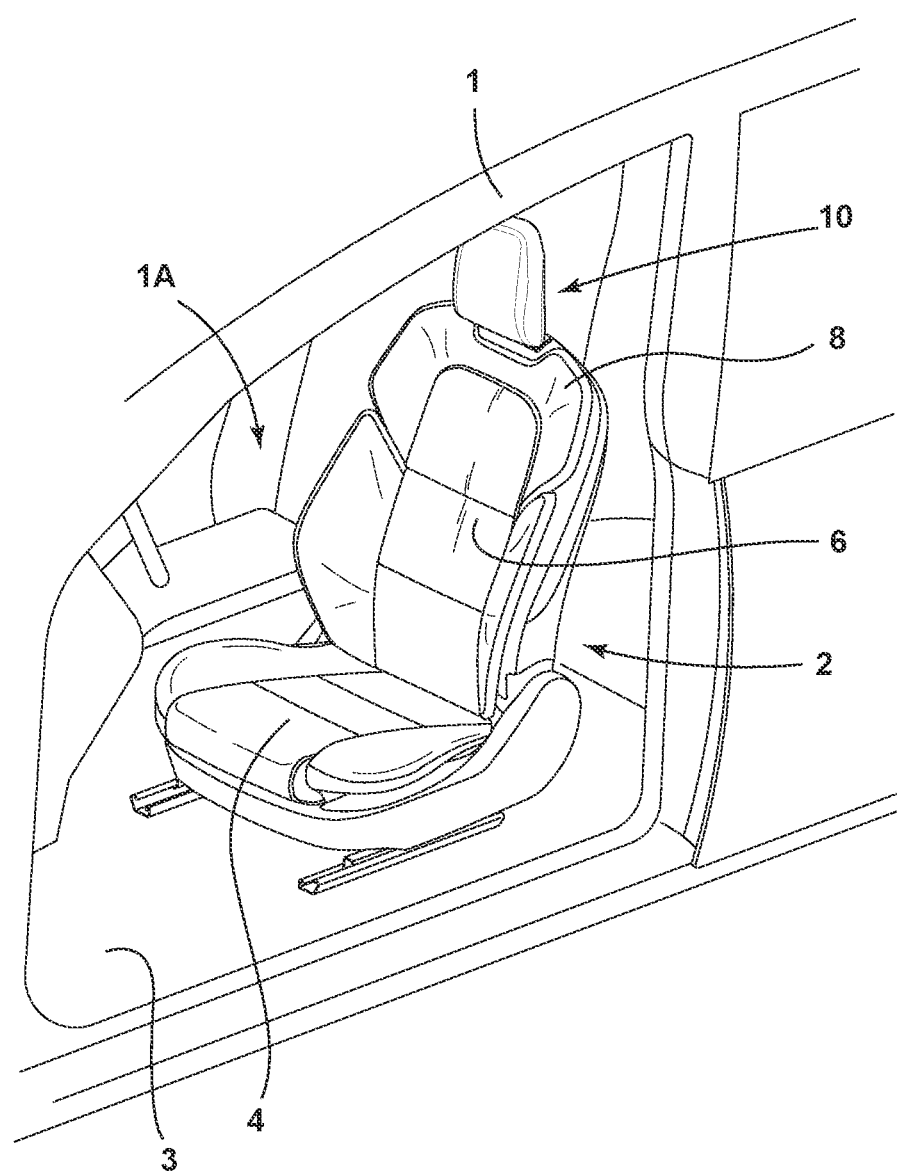
FIG. 1 is a top perspective view of a seat assembly positioned within a vehicle interior.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring now to FIG. 1, a seat assembly 2 is shown disposed within an interior 1A of a vehicle 1 on a floor surface 3 of the vehicle 1. As shown, the seat assembly 2 includes a seat portion 4 and a seatback 6 with a headrest assembly 10 positioned on an upper portion 8 of the seatback 6. The seat assembly 2 shown in FIG. 1 may be positioned in any location within the vehicle interior 1A. Further, the seat assembly 2 is a seat assembly that is typically found in a driver's side or front passenger's side of a vehicle. However, it is contemplated that the headrest assembly 10 of the present concept can be used on any seat assembly within a vehicle interior, including, but not limited to, rear seat assemblies and third row seating options.

Figure 2:
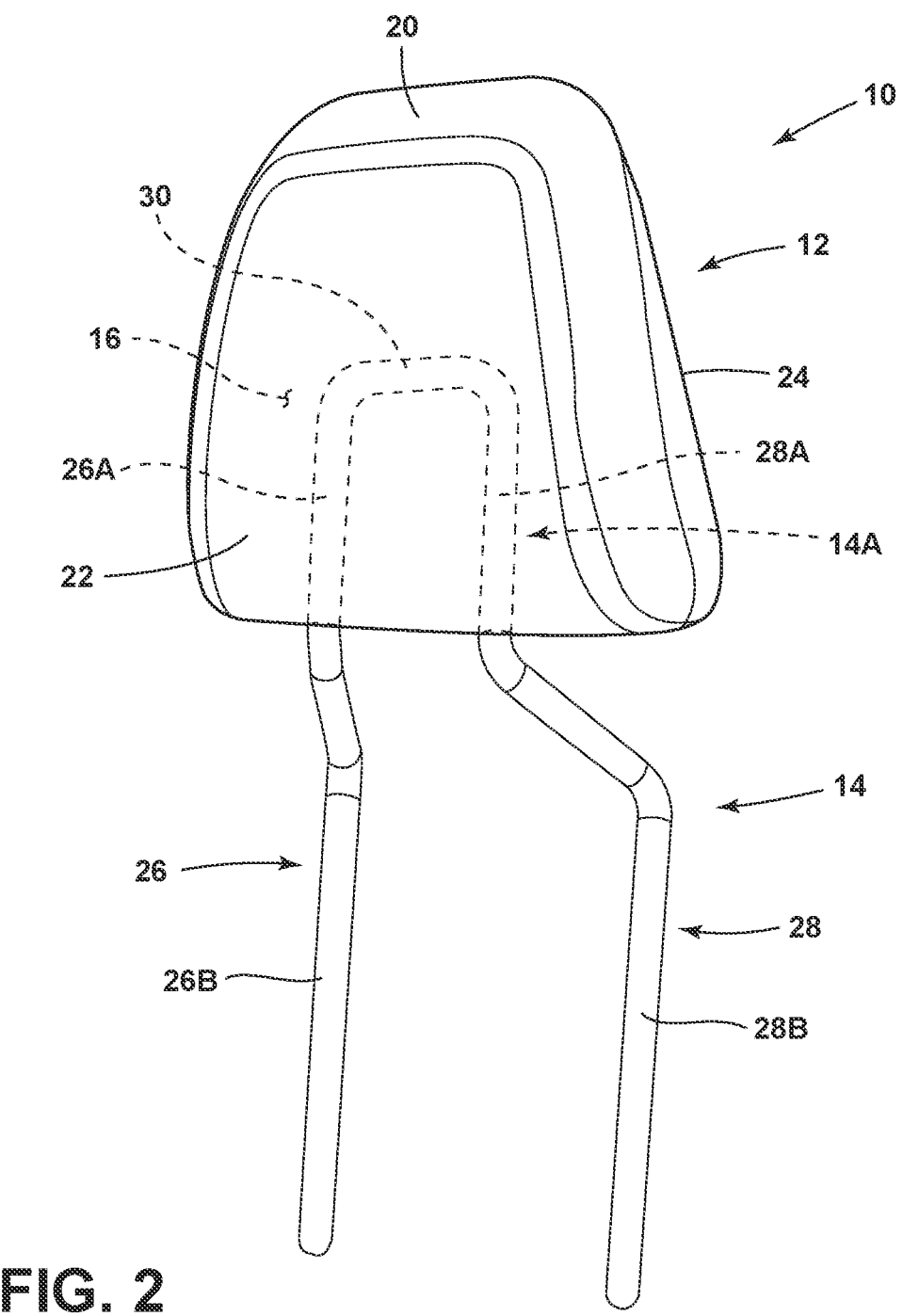
FIG. 2 is a top perspective view of a headrest assembly with a portion of a support armature thereof shown in phantom within an interior portion of a headrest bun.

Referring now to FIG. 2, the headrest assembly 10 includes a headrest bun 12 supported by a support armature 14. The headrest bun 12 includes an interior portion 16 surrounded by an outer casing 20. The outer casing 20 includes first and second sides 22, 24 that are spaced-apart from one another to define the interior portion 16 disposed therebetween. The first and second sides 22, 24 of the outer casing 20 may define front and rear surfaces of the outer casing 20, respectively. As such, the first and second sides 22, 24 of the outer casing 20 may further define front and rear surfaces of the overall headrest assembly 10. The outer casing 20 may include a leather, suede, polymeric or vinyl material that is stretched over a padding and support materials disposed within the interior portion 16 of the headrest bun 12.

As further shown in FIG. 2, the support armature 14 is configured to couple the headrest assembly 10 to the upper portion 8 of the seatback 6 shown in FIG. 1. The support armature 14 is contemplated to be a metal member which may be comprised of a steel or aluminum material, for example only, and which includes first and second support posts 26, 28 which are interconnected by an upper cross-member 30 to provide an overall inverted U-shaped configuration to the support armature 14. A portion 14A of the support armature 14 is disposed within the interior portion 16 of the headrest bun 12. The portion 14A of the support armature 14 that is disposed within the interior portion 16 of the headrest bun 12 is comprised of upper portions 26A, 28A of the support posts 26, 28 and the upper cross-member 30. Lower portions 26B, 28B of the first and second support posts 26, 28 outwardly extend from a lower portion of the headrest bun 12 for coupling to a frame assembly of the seat assembly 2, in what could be a vertically adjustable manner. In this way, the support armature 14 is configured to support the headrest bun 12 above the seatback 6 of the seat assembly 2 (FIG. 1), such that the headrest assembly 10 is rigidly supported on the seat assembly 2 by the support armature 14, which is contemplated to be a fixed member.

Figure 3:
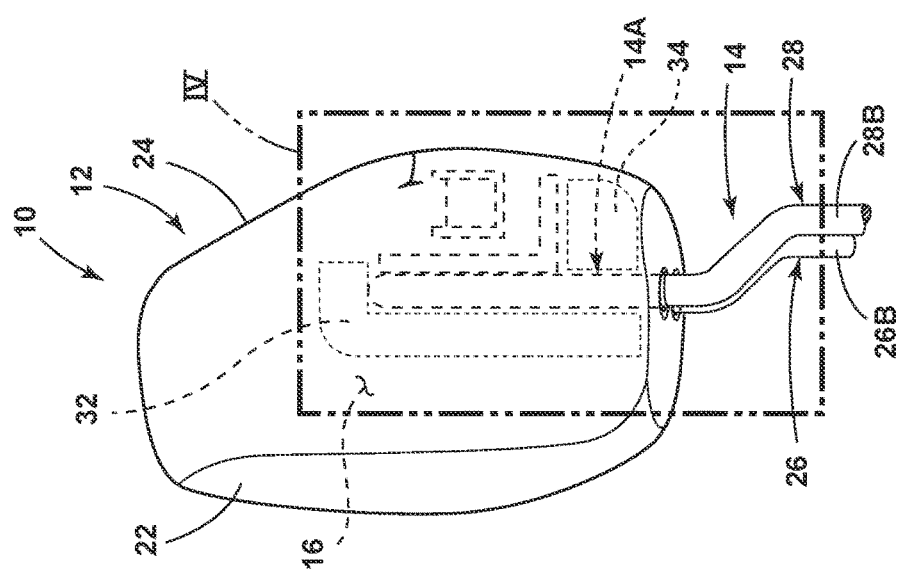
FIG. 3 is a side elevation view of a headrest assembly with interior components thereof shown in phantom.

Referring now to FIG. 3, the headrest assembly 10 is shown with a window positioned at location IV in FIG. 3 showing internal parts of the headrest assembly 10 positioned within the interior portion 16 of the headrest bun 12. As shown in FIG. 3, the first and second sides 22, 24 of the outer casing 20 are positioned in a spaced-apart configuration to define the interior portion 16 of the headrest bun 12 therebetween. As shown in FIG. 3, as well as FIG. 4, the headrest bun 12 may include a number of cushion materials 32, 34 disposed within the interior portion 16 of the headrest bun 12 to provide bulk and cushioning support to the headrest assembly 10.

Figure 4:
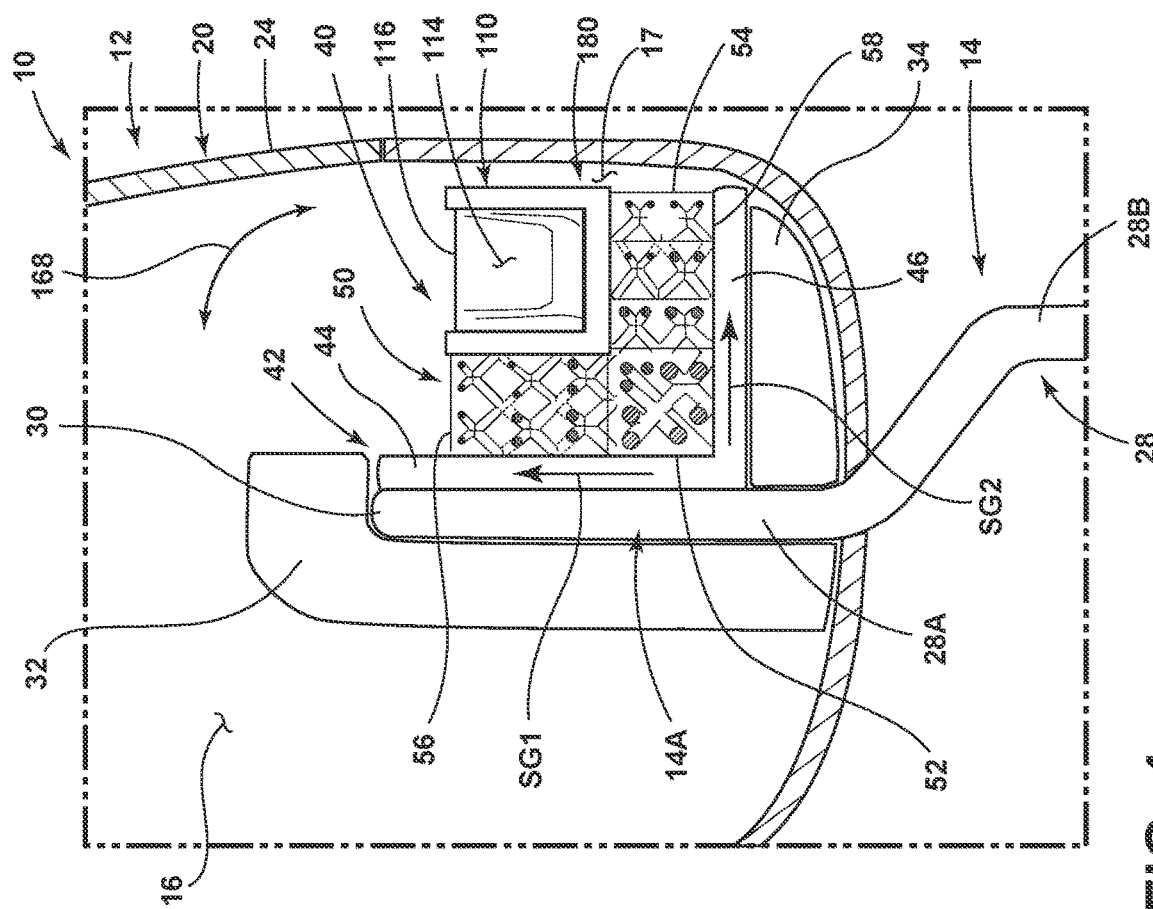
FIG. 4 is a cross sectional view of the headrest assembly of FIG. 3 taken at location IV.

Referring now to FIG. 4, a partial crossectional view of the headrest assembly 10 is shown at location IV of FIG. 3. As shown in FIG. 4, the headrest assembly 10 includes a support member 40 disposed within the interior portion 16. The support member 40 is supported within the interior portion 16 of the headrest bun 12 by the support armature 14. Specifically, the portion 14A of the support armature 14 disposed within the interior portion 16 of the headrest bun 12 is operably coupled to the support member 40 to support the same therefrom. In the embodiment shown in FIG. 4, the support member 40 includes an attachment bracket 42 that is contemplated to be a rigid member. The attachment bracket 42, as shown in the embodiment of FIG. 4, includes a first arm 44 that is an upwardly extending arm that defines a first mounting surface for mounting the support member 40 to the support Armature 14. As further shown in FIG. 4, the attachment bracket 42 includes a second arm 46 that is a rearwardly extending arm that defines a second mounting surface. Together, the first and second mounting surfaces defined by the first and second arms 44, 46 of the attachment bracket 42 cooperate to support a lattice matrix 50 therefrom. In this way, the support member 40 includes a lattice matrix 50 disposed within the interior portion 16 of the headrest bun 12.

As used herein, the term "lattice matrix" refers to a structural pattern of interconnected links that define cells or voids therebetween, wherein the overall pattern resembles an expanded material configuration. As shown in FIG. 4, the lattice matrix 50 includes a first side 52 and a second side 54, as well as an upper side 56 and a lower side 58. The first side 52 of the lattice matrix 50 is operably coupled to first arm 44 of the attachment bracket 42. The lower side 58 of the lattice matrix 50 is operably coupled to the second arm 46 of the attachment bracket 42. Thus, the first side 52 and the lower side 58 of the lattice matrix 50 are operably coupled to the first and second arms 44, 46 of the attachment bracket 42 to form an integrated whole. As such, the support member 40 is contemplated to be a unitary or monolithic structure which may be formed from an additive manufacturing technique that uses a common material to integrally form the attachment bracket 42 with the lattice matrix 50 in a unitary manner, as further described below. As a rigid member, the attachment bracket 42 may be a solid member that is formed using the same material as the lattice matrix 50, which is contemplated to be a deflectable member that is flexibly resilient, as further described below. The lattice matrix 50 is contemplated to provide a stiffness gradient that extends outwardly in the directions as indicated by arrows SG1 and SG2, as further described below with reference to FIG. 5. As further shown in FIG. 4, a receptacle 110 is disposed within the interior portion 16 of the headrest bun 12 and operably coupled to the lattice matrix 50. The receptacle 110 includes an interior cavity 114 in which an insert 116 is received. The receptacle 110 may also be a solid member that is manufactured with the lattice matrix 50 and the attachment bracket 42 to create a unitary part. The insert 116 is provided as a weighted member to provide a dynamic mass damper effect incorporated into the headrest assembly 10, as further described below. It is contemplated that the insert 116 can be inserted and removed from the receptacle 110, such that the receptacle 110 is configured to receive a variety of inserts for a desired dampening effect. It is further contemplated that the support member 40 may include a plurality of lattice matrices, receptacles and receptacle inserts, as further discussed below with reference to FIG. 8.

The support member 40 discussed herein is contemplated to be comprised of a single material used in an additive manufacturing process to form the lattice matrix 50, the attachment bracket 42 and the receptacle 110 into a fully integrated monolithic structure. As used herein, the term "integrated" refers to component parts of a unitary whole that are formed together to provide the monolithic structure of the overall article. In this way, the term "integrated" is used herein to describe component parts that are formed together is a unitary whole, as opposed to components that are separately formed and later operably coupled to one another in assembly. As used herein, the term "monolithic structure" is used to describe a structure that is integrally formed in a forming process, such as an additive manufacturing technique. Additive manufacturing techniques contemplated for use with the present concept may include 3D printing, laser sintering and other known additive manufacturing techniques. In this way, the monolithic structures of the present concept provide unitary structures comprised of multiple configurations and features. It is noted that the monolithic structures of the present concept may include a single or common material used in the additive manufacture of the structure. Further, the lattice matrices of the present concept are not only monolithic in structure, but are specifically configured to provide variated density profiles within lattice matrices to ultimately provide a stiffness gradient, as further described below.

With further reference to FIG. 4, the attachment bracket 42 and the receptacle 110 are contemplated to be integrated components of the lattice matrix 50, in that the attachment bracket 42, the receptacle 110 and the lattice matrix 50 are contemplated to be comprised of a common material used in an additive manufacturing process to create a monolithic structure in the form of the support member 40. As such, it is contemplated that the support member 40, which may include the lattice matrix 50, the attachment bracket 42 and the receptacle 110 thereof, may be created using a single additive manufacturing process, such as a 3D printing process to create a monolithic 3D printed unitary part comprised of a common material throughout. Thus, it is contemplated that the lattice matrix 50, the attachment bracket 42 and the receptacle 110 may be additively manufactured using a polymeric material that allows the parts, when specifically configured, to flex or deflect under various forces. As shown in FIG. 4, the support member 40 is positioned in a rear lower quadrant 17 of the interior portion 16 of the headrest bun 12. In this way, the support member 40 is positioned rearwardly behind the support armature 14 within the interior portion 16 of the headrest bun 12. Other locations within the interior portion 16 of the headrest bun 12 are contemplated as being suitable for the support member 40, however, placement behind the support armature 14 is preferred. The polymeric lattice matrix 50, attachment bracket 42 and receptacle 110 coupled with the metal insert 116 provides for a metamaterial configured to provide a dynamic damper effect, as further described below.

Figure 5:
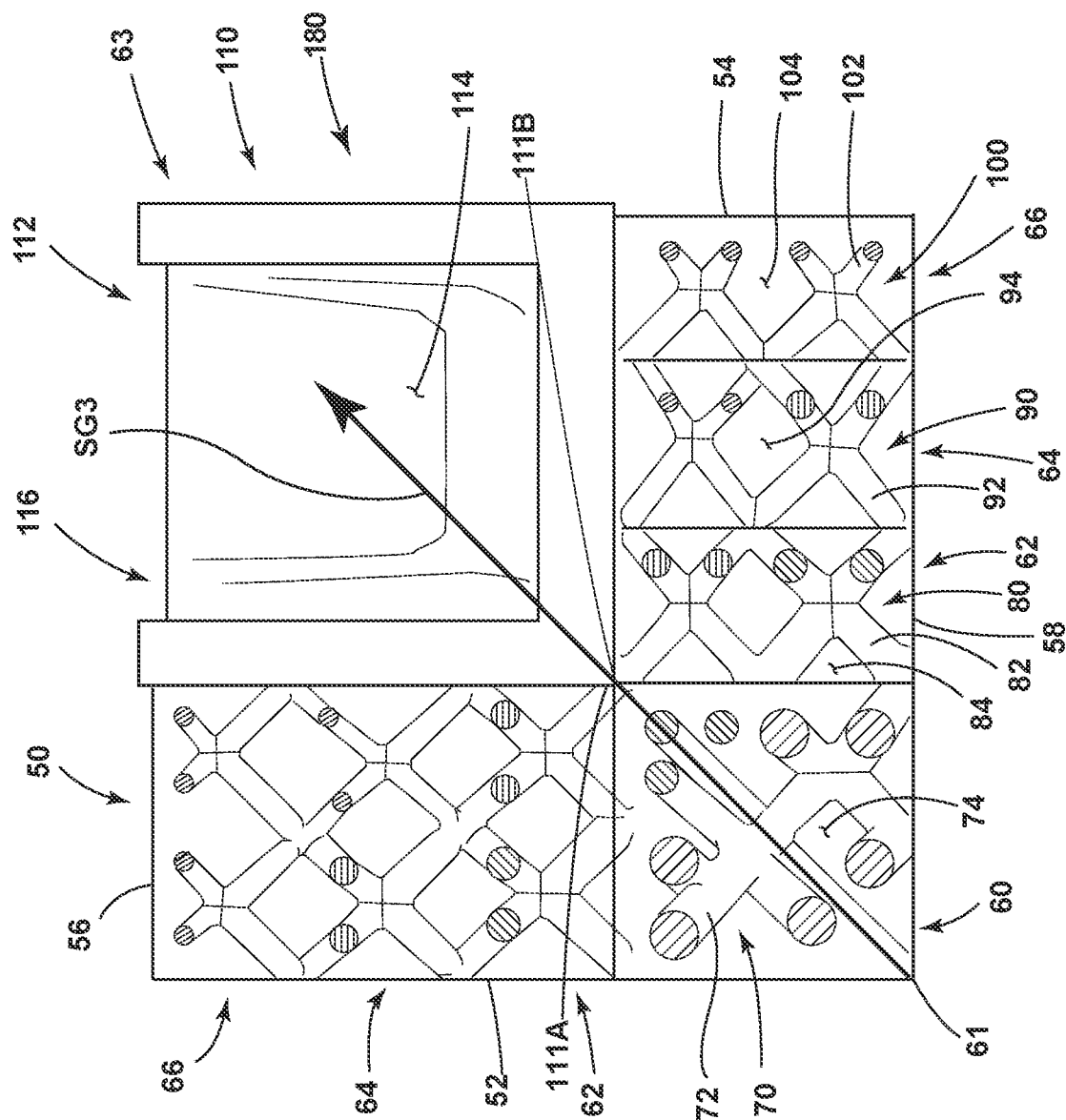
FIG. 5 is a side elevation view of a resonator.

Referring now to FIG. 5, the lattice matrix 50 of the support member 48 includes a first portion 60, a second portion 62, a third portion 64 and a fourth portion 66. It is contemplated that the lattice matrix 50 may include multiple portions beyond the four portions shown in the embodiment of FIG. 4. In the embodiment of FIG. 4, the lattice matrix 50 is contemplated to provide a stiffness gradient that decreases in stiffness from an inner portion 61 of the lattice matrix 50 to an outer portion 63 of the lattice matrix 50 along the path as indicated by arrow SG3, as further described below.

As shown in FIG. 5, the first portion 60 of the lattice matrix 50 includes a first pattern 70 of interconnected links 72, wherein the interconnected links 72 cooperate as a plurality of interconnected links disposed in an interconnected network to define a first set of cells 74 disposed between the plurality of interconnected links. As further shown in FIG. 5, the second portion 62 of the lattice matrix 50 includes a second pattern 80 of interconnected links 82, wherein the interconnected links 82 cooperate as a plurality of interconnected links disposed in an interconnected network to define a second set of cells 84 disposed between the plurality of interconnected links. Similarly, the third portion 64 of the lattice matrix 50 includes a third pattern 90 of interconnected links 92, wherein the interconnected links 92 cooperate as a plurality of interconnected links disposed in an interconnected network to define a third set of cells 94 disposed between the plurality of interconnected links. Finally, the fourth portion 66 of the lattice matrix 50 includes a fourth pattern 100 of interconnected links 102, wherein the interconnected links 102 cooperate as a plurality of interconnected links disposed in an interconnected network to define a fourth set of cells 104 disposed between the plurality of interconnected links. The interconnected links 72, 82, 92 and 102 of the respective patterns 70, 80, 90 and 100 are all generally shown disposed in a crisscrossing lattice configuration to provide a corresponding shape for the various sets of respective cells 74, 84, 94 and 104. Other patterns for the various portions 60, 62, 64 and 66 of the lattice matrix 50 are also contemplated for use with the present concept, which may result in cells of a different shape than the various sets of cells 74, 84, 94 and 104 shown in FIG. 5. The various sets of cells 74, 84, 94 and 104 generally define voids at the various portions 60, 62, 64 and 66 of the lattice matrix 50.

As noted above, the lattice matrix 50 is contemplated to include a stiffness gradient that decreases in stiffness from the inner portion 61 of the lattice matrix 50 to the outer portion 63 of the lattice matrix 50. Said differently, the stiffness gradient of the lattice matrix 50 is contemplated to increase from the outer portion 63 of the lattice matrix 50 to the inner portion 61 of the lattice matrix 50. It is contemplated that the various portions 60, 62, 64 and 66 of the lattice matrix 50 may be layered on top of one another, or fully surrounding one another to provide the stiffness gradient described above. In this way, it is contemplated that the lattice matrix 50 of the present concept is a deflectable member. As used herein, the term "deflectable" refers to a component that is considered cushioning, such that the component is compressible when under pressure from an applied force. The term "deflectable" is also used herein to describe a component part that is flexibly resilient. In this way, a deflectable component part is contemplated to a be a part that can be compressed from an at-rest condition to a compressed condition under a compression force, and is further contemplated to resiliently return to the at-rest condition from the compressed condition after the compression force is removed. Thus, a deflectable lattice matrix described herein acts as a cushioning component of the headrest assembly 10 that can support the receptacle 110 and insert 116 in a manner that absorbs movement of the receptacle 110 and insert 116.

In order to provide the deflectable nature of the lattice matrix 50, as well as the stiffness gradient, the various portions 60, 62, 64 and 66 of the lattice matrix 50 include different patterns of interconnected links resulting in different properties per portion. For example, the first portion 60 of the lattice matrix 50 includes interconnected links 72 of a first thickness, resulting in cells 74 of a first size. The second portion 62 of the lattice matrix 50 includes interconnected links 82 of a second thickness that is less than the first thickness of the interconnected links 72 of the first portion 60, resulting in cells 84 of a second size that are greater than the cells 74 of the first portion 60. In this way, it is contemplated that the first portion 60 of the lattice matrix 50 is stiffer or more rigid than the second portion 62 of the lattice matrix 50. This is due to the increased thickness of the interconnected links 72 of the first portion 60, as well as the increased size of the cells 84 of the second portion 62 as compared to the cells 74 of the first portion 60. The same is true for the third and fourth portions 64, 66 of the lattice matrix 50. Thus, the interconnected links 92 of the third portion 64 include a third thickness that is less than the second thickness of the interconnected links 82 of the second portion 62. Similarly, the interconnected links 102 of the fourth portion 66 of the lattice matrix 50 include a fourth thickness that is less than the third thickness of the interconnected links 92 of the third portion 64. Thus, the third set of cells 94 are of a third size that is larger than the second size of the cells 84 of the second portion 62 of the lattice matrix 50, while the fourth set of cells 104 are of a fourth size that is larger than the third size of the cells 94 of the third portion 64 of the lattice matrix 50.

All of the interconnected links 72, 82, 92 and 102 of the respective patterns 70, 80, 90 and 100 of the respective portions 60, 62, 64 and 66 are contemplated to be comprised of a deflectable material. Thus, the interconnected links 72 of the first portion 60 are still contemplated to be deflectable, but are more rigid than the interconnected links 82, 92 and 102 of other portions 62, 64 and 66 of the lattice matrix 50. The increasing cells size from the first portion 60 of the lattice matrix 50 to the fourth portion 66 of the lattice matrix 50 makes for greater voids for the respective interconnected links to deflect or deform into when under pressure. As such, the stiffness gradient can vary based on the thickness of the interconnected link and the size of the cell surrounding the interconnected links. For example, the various portions 60, 62, 64 and 66 of the lattice matrix 50 could include cells of the same size disposed between interconnected links of a decreasing thickness (as shown in FIG. 5) to provide the stiffness gradient SG3 shown in FIG. 5. Similarly, the various portions 60, 62, 64 and 66 of the lattice matrix 50 could include interconnected links of the same thickness that are disposed around cells of increasing size (as shown in FIG. 5) to provide the stiffness gradient SG3 shown in FIG. 5. Or, the lattice matrix 50 may include both a decreasing thickness of interconnected links and increasing size of respective cells for the various portions 60, 62, 64 and 66 of the lattice matrix 50, such as shown in the embodiment of FIG. 5.

Thus, the lattice matrix 50 includes a stiffness gradient, as described above, that may be defined by a thickness gradient, a cell size gradient, or both. The thickness gradient refers to the interconnected links 72, 82, 92 and 102 of the respective patterns 70, 80, 90 and 100 of the respective portions 60, 62, 64 and 66 that decrease in thickness from an inner portion 61 of the lattice matrix 50 to an outer portion 63 of the lattice matrix 50. The cell size gradient refers to the cells 74, 84, 94 and 104 of the respective patterns 70, 80, 90 and 100 of the respective portions 60, 62, 64 and 66 of the lattice matrix 50 that increase in size from an inner portion 61 of the lattice matrix 50 to an outer portion 63 of the lattice matrix 50. Both the thickness gradient and the cell size gradient contribute to the overall stiffness gradient SG3 of the lattice matrix 50.

It is contemplated that the various portions 60, 62, 64 and 66 of the lattice matrix 50 may surround one another, or may be layered upon one another, to provide the stiffness gradient SG3. It is also contemplated that the lattice matrix 50 may surround the receptacle 110 as well. In the embodiment shown in FIG. 5, the receptacle 110 is shown disposed at the outer portion 63 of the lattice matrix 50. In this way, the receptacle 110 is contemplated to be disposed at the portion of the lattice matrix 50 that has the least stiffness, or, said differently, the most deflectable portion of the lattice matrix 50. In this way, the receptacle 110, and the insert 116 supported therein, can move within the interior portion 16 of the headrest bun 12 to absorb vibrations that are generally realized on the headrest assembly 10 through the seat assembly 2 during operation of the vehicle 1 (FIG. 1). While the lattice matrix 50 may surround the receptacle 110, it is contemplated that an open top 112 of the receptacle 110 may be accessible for insertion of the insert 116 into the interior cavity 114 of the receptacle 110. With specific reference to FIG. 4, the receptacle 110 is shown having a lower front portion 111A, and a front bottom portion 111B operably coupled with the first portion 60 of the lattice matrix 50. In this way, the increased stiffness of the first portion 60 of the lattice matrix 50 helps to rebound the receptacle 110 to its at-rest position from a deflected position. Again, as noted above, having the receptacle 110 disposed at a more deflectable portion of the lattice matrix 50 allows the receptacle 110 to deflect within the lattice matrix 50. Having the receptacle 110 also operably coupled to the first portion 60 of the lattice matrix 50, provides for a lattice matrix that is operably coupled to the stiffest portion of the lattice matrix 50 on first and second faces respectively defined by the front wall 124 and the lower wall 130 of the receptacle 110, as described below with reference to FIGS. 6 and 7. The coupling of the receptacle 110 at the lower front portion 111A along the front face defined by the front wall 124 and at the front bottom portion 111B along the bottom face defined by the lower wall 130 allows for the receptacle 110 to deflect along two axes. Specifically, the receptacle 110 and the insert 116 define a resonator 180 (FIG. 4) when the insert 116 is disposed within the interior cavity 114 of the receptacle 110. The resonator 180 is configured for deflection in first and second directions as indicated by arrow 168 (FIG. 4) and arrow 170 (FIG. 8). Thus, the first axis of deflection for the resonator 180 is in a generally fore and aft direction, as indicated by arrow 168, as well as a lateral direction, as indicated by arrow 170, within the interior portion 16 of the headrest bun 12.

A more-dense lattice portion, such as the first portion 60 described above, is more rigid and supportive. A sparse or less-dense lattice portion, such as the second, third and fourth portions 62, 64 and 66 described above, is more pliable and provides plushness. Thus, lattice matrix 50, when tuned to a specific stiffness, can act as the compliant foundation for metamaterial designs. The frequency of each resonator provided in the support member 40 depends upon the suspended mass (i.e. the weight of the insert) as well as the stiffness of the lattice matrix that supports it. With further reference to FIG. 5, the higher lattice density of the first portion 60 provides the actual stiffness simulation of a spring-based metamaterial, and the low density lattice portions (portions 62, 64 and 66) surround the resonator 180 and help reset the resonator 180 to its null or at-rest position (shown in FIGS. 4, 5 and 8) after deflection along one of the above-noted axes 168, 170 (FIGS. 4 and 8).

Figure 6:
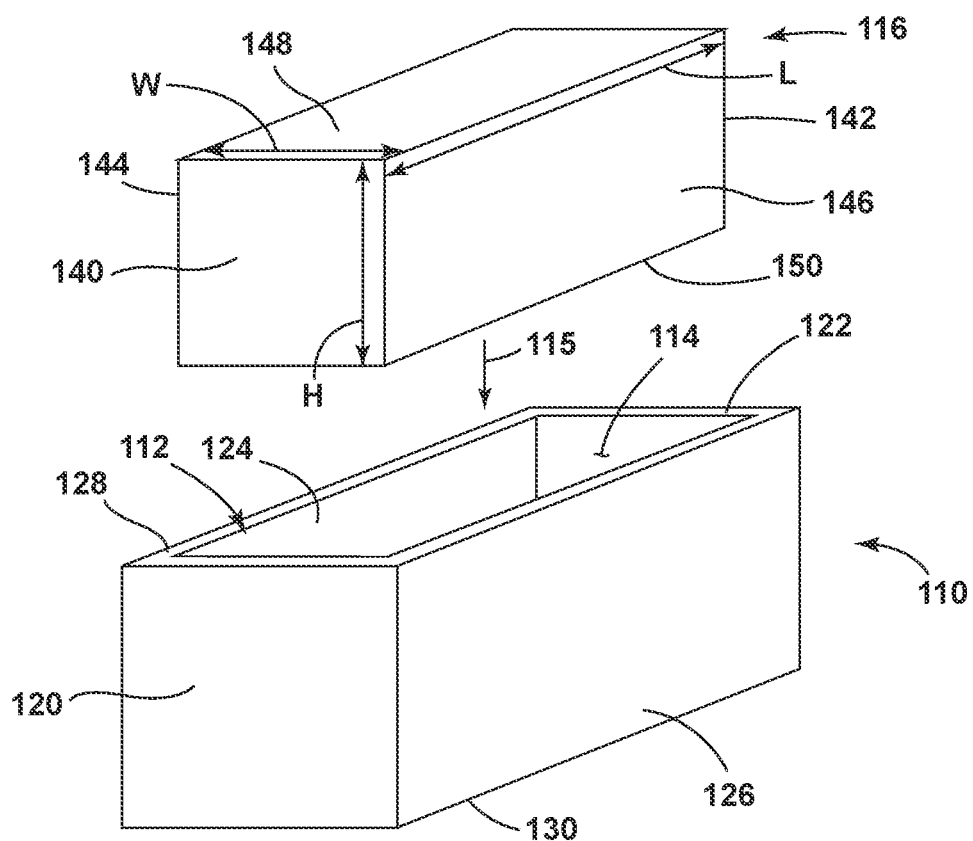
FIG. 6 is a top perspective view of a receptacle with and insert exploded away therefrom.

Referring now to FIG. 6, the insert 116 is shown being received into the interior cavity 114 of the receptacle 110 in the direction as indicated by arrow 115. Thus, the insert 116 is configured to be received into the interior cavity 114 of the receptacle 110 through the open top portion 112 of the receptacle 110. In this way, the insert 116 is contemplated to be a set in place insert with regards to the receptacle 110. It is contemplated that the open top portion 112 of the receptacle 110 is accessible for positioning the insert 116 therein. As described above, the receptacle 110 may receive a variety of inserts having different weights as needed to provide a desired dampening effect. In the embodiment shown in FIG. 6, the insert 116 includes first and second sidewalls 140, 142, front and rear walls 144, 146, and upper and lower walls 148, 150. Similarly, the receptacle 110 includes first and second sidewalls 120, 122, front and rear walls 124, 126, and upper and lower walls 128, 130, which cooperate to define the interior cavity 114. The open top portion 112 of the receptacle 110 is disposed on the upper wall 128 and opens into the interior cavity 114. Thus, the receptacle 110 is contemplated to be a solid member with an opening disposed on a single side (upper wall 128 in the embodiment shown in FIGS. 6 and 7) for insertion of the insert 116 into the interior cavity 114 of the receptacle 110. As noted above, portions of the front wall 124 and the lower wall 130 are operably coupled to the first portion 60 (i.e. the stiffest portion of the lattice matrix 50) in assembly, as shown in FIGS. 4 and 5.

It is contemplated that an embodiment having a single insert may have an insert with a height H of about 55 mm, a width W of about 55 mm and a length L of about 195 mm to provide a generally overall rectangular configuration. The dimensions noted above are exemplary dimensions only, and the shape of the insert 116 may include other configurations. The configuration of the insert 116 shown in FIG. 6 is contemplated to closely mirror the configuration of the interior cavity 114 of the receptacle 110, which is also shown in a rectangular configuration in FIG. 6. Other configurations for the interior cavity 114 of the receptacle 110 are also contemplated. Further, multiple receptacles and corresponding inserts may be used in a single support member, as further described below with reference to FIG. 8.

The insert 116 is contemplated to be a metal material, such as steel or tungsten, which may be a solid member that is used to absorb energy and mitigate vibration within the headrest assembly 10 (FIG. 1). In this way, the insert 116 is contemplated to be a weighted member which may include a weight within a range of about 30 g to about 500 g. As noted above, different inserts having different weights can be used with the present concept to provide a desired dampening effect. Further, a plurality of inserts can be used with a plurality of receptacles in a single support member configuration to provide a mass damper effect that is specifically tuned to various resonances, as further described below. Thus, the combination of multiple inserts may have a weight in a range of about 30 g to about 500 g.

Figure 7:
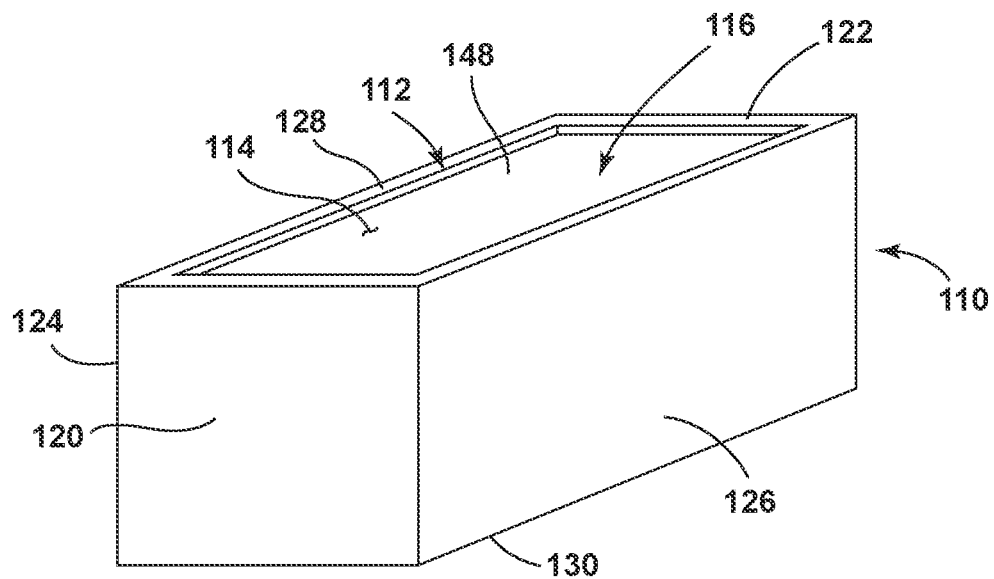
FIG. 7 is a top perspective view of the receptacle of FIG. 6 with the insert received therein.
Figure 8:
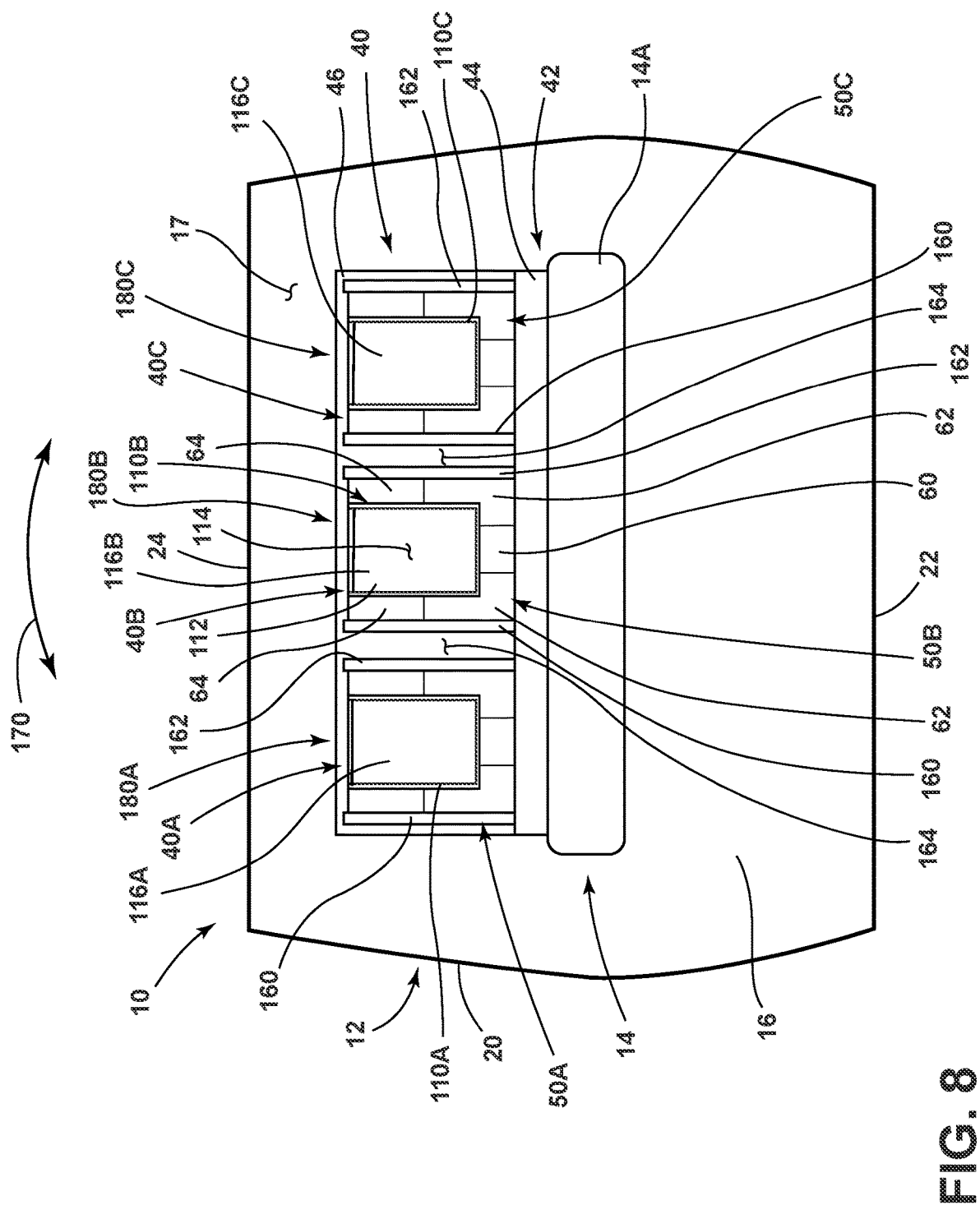
FIG. 8 is a top plan view of a headrest assembly showing multiple resonators disposed within an interior portion of a headrest bun.

Referring now to FIG. 7, the insert 116 is shown inserted into the interior cavity 114 of the receptacle 110. It is contemplated that the insert 116 can be removed from the interior cavity 114 of the receptacle 110, such that the insert 116 is contemplated to be removeably received within the interior cavity 114 of the receptacle 110. In the embodiment shown in FIG. 6 and FIG. 7, the receptacle 110 is not included with the lattice matrix 50 (FIGS. 4, 5), but is contemplated to be a unitary part constructed with the lattice matrix 50 to provide a fully integrated support member 48 (FIGS. 4, 5) that is comprised of a common material contemplated to be manufactured using an additive manufacturing technique to define an overall monolithic structure positioned within the interior portion 16 of the headrest bun 12 (FIG. 4). The receptacles 110 disclosed herein are contemplated to be a flexible units to allow easy installation and removal of the inserts 116.

Referring now to FIG. 8, the headrest assembly 10 is shown from a top view to reveal the interior portion 16 of the headrest bun 12. In the embodiment shown in FIG. 8, the support member 40 includes a plurality of local resonators 180A, 180B and 180C which are contemplated to be tuned to different frequencies around the resonance frequency of the parent structure (i.e. the seat assembly 2 (FIG. 1)). Thus, in the example shown in FIG. 8, the resonators 180A, 180B and 180C may include a specific weight that is tuned to a specific frequency calibrated around the resonance frequency of the seat assembly 2 (FIG. 1) upon which the headrest assembly 10 is disposed. For example, at the seat assembly 2 may include a resonance frequency of 12.7 Hz. Thus, the first resonator 180A may be tuned to a frequency of 11.7 Hz, the second resonator 180B may be tuned to a frequency of 12.7 Hz, and the third resonator 180C may be tuned to a frequency of 13.7 Hz. In this way, the support member 40 of the embodiment shown in FIG. 8 includes multiple local resonators 180A, 180B and 180C having different masses, sizes or shapes to be tuned to the specific frequencies that are calibrated around the resonance frequency of the parent structure, which in this case is the seat assembly 2. As shown in FIG. 8, each individual resonator 180A-180C and its respective surrounding lattice matrix 50A-50C are separated from one another by void volumes 164, which provide room for the individual resonators 180A-180C to deflect and displace from their at-rest positions to their deflected positions along the axes 168 (FIG. 4) and 170 without interference from neighboring structures. Each resonator 180A, 180B and 180C is defined by the lattice matrix 50A, 50B and 50C supporting the resonator, and the respective receptacles 110A, 110B, 110C and inserts 116A, 116B, 116C received therein. It is contemplated that each individual resonator 180A, 180B and 180C can have a different mass, size or shape in order to provide a specific dampening effect.

As further shown in FIG. 8, the resonators 180A, 180B and 180C may include solid isolator walls 160, 162 disposed on opposed sides of the lattice matrices 50A, 50B, 50C. With reference to resonator 180B, the lattice matrix 50B thereof will be described, and it is contemplated that the description of the lattice matrix 50B will also serve as a suitable description for the lattice matrices 50A and 50C. In the embodiment shown in FIG. 8, the lattice matrix 50B includes the first portion 60, second portion 62 and third portion 64, which are contemplated to be similar to the first, second and third portions 60, 62 and 64 described above with reference to FIG. 5. Thus, a stiffness gradient is can't a blade be provided in the lattice matrix 50B. The receptacle 110B is shown as being operably coupled to the first portion 60 of the lattice matrix 50B, while the remainder of the receptacle 110B is surrounded by the second and third portions 62, 64 of the lattice matrix 50B. In this way, the receptacle 110B is able to deflect laterally and in a fore and aft direction as indicated by respective arrows 170, 168 (FIG. 4). The receptacle 110B includes an open top portion 112 for receiving the insert 116B therein. Thus, the various receptacles 110A, 110B, 110C are contemplated to be accessible for the placement of the respective inserts 116A, 116B, 116C therein for providing a custom tuned mass damper mechanism in the support member 40, as further described below with reference to FIGS. 9A and 9B.

Referring now to FIG. 9A, the headrest assembly 10 is shown from a rear top perspective view, wherein the second side 24 of the outer casing 20 is shown as having a flap portion 190. The flap portion 190 can be opened from a seam 194 along the path indicated by arrow 192 to access the interior portion 16 of the headrest bun 12. Specifically, the flap portion 190 is operable between open and closed positions and can be opened to access the resonators 180A, 180B and 180C and the respective receptacles 110A, 110B, 110C thereof (FIG. 8). In this way, the respective inserts 116A, 116B, 116C of the resonators 180A, 180B and 180C can be inserted into the respective receptacles 110A, 110B, 110C the resonators 180A, 180B and 180C along the path as indicated by arrow 196 for vertical loading into the 110A, 110B, 110C. The flap portion 190 of the outer casing 20 can be sealed by the manufacturer after the inserts are placed according to the desired manufacture's specifications.

According to a first aspect of the present disclosure, a headrest assembly includes a headrest having an interior portion, and a support armature having a portion thereof disposed within the interior portion of the headrest bun. A support member includes a lattice matrix having a plurality of interconnected links. The support member is supported within the interior portion of the headrest bun by the support armature. A receptacle is operably coupled to the lattice matrix of the support member within the interior portion of the headrest bun and includes an interior cavity. An insert is removeably received within the interior cavity of the receptacle.

Embodiments of the first aspect of the present disclosure can include any one or a combination of the following features:

- the plurality of interconnected links of the lattice matrix are configured in a pattern providing a stiffness gradient that decreases in stiffness from an inner portion of the lattice matrix to an outer portion of the lattice matrix;
- the plurality of interconnected links of the lattice matrix are configured in a pattern providing a thickness gradient of the plurality of interconnected links that decreases in a thickness of the interconnected links of the plurality of interconnected links from an inner portion of the lattice matrix to an outer portion of the lattice matrix;
- the support member includes an attachment bracket operably coupled to the support armature and the lattice matrix;
- the lattice matrix and the attachment bracket are comprised of a common material to define the support member as a monolithic structure;
- the lattice matrix is deflectable;
- the insert includes a metal material;
- the insert is a weighted member having a weight in a range of about 30 g to about 500 g;
- the plurality of interconnected links includes first and second portions having first and second patterns of interconnected links to thereby define a first set of cells and a second set of cells disposed throughout the first and second patterns of interconnected links, respectively;
- the first set of cells of the first portion of the lattice matrix includes cells comprised of a first size, and further wherein the second set of cells of the second portion of the lattice matrix includes cells comprised of a second size that is greater than the first size; and
- the first pattern of interconnected links include interconnected links of a first thickness, and further wherein the second pattern of interconnected links include interconnected links of a second thickness that is greater than the first thickness.

According to a second aspect of the present disclosure, a headrest assembly includes a headrest bun having an interior portion. A support armature includes a portion thereof disposed within the interior portion of the headrest bun. A receptacle is disposed within the interior portion of the headrest bun and operably coupled to the portion of the support armature disposed within the interior portion of the headrest bun. The receptacle includes an open top portion opening into an interior cavity. An insert is removeably received within the interior cavity of the receptacle.

Embodiments of the second aspect of the present disclosure can include any one or a combination of the following features:

- the insert includes a metal material; and
- the insert is a weighted member having a weight in a range of about 30 g to about 500 g.

According to a third aspect of the present disclosure, a headrest assembly includes a headrest bun having an interior portion. A plurality of resonators is disposed within the interior portion of the headrest bun. Each resonator of the plurality of resonators includes a receptacle operably coupled to a deflectable lattice matrix and an insert received within an interior cavity of the receptacle.

Embodiments of a third aspect of the present disclosure can include any one or a combination of the following features:

- each receptacle of the plurality of resonators is integrated into the deflectable lattice matrix to define monolithic structures;
- each deflectable lattice matrix of the plurality of resonators includes a stiffness gradient that decreases in stiffness from an inner portion to an outer portion;
- the plurality of resonators includes first and second resonators, and further wherein the first resonator is tuned to a first frequency and the second resonator is tuned to a second frequency that is different than the first frequency;
- the first resonator is spaced-apart from the second resonator; and
- the first and second resonators are both configured to deflect along first and second axes.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A headrest assembly, comprising:
   a headrest bun having an interior portion;
   a support armature having a portion thereof disposed within the interior portion of the headrest bun;
   a support member having a lattice matrix including a plurality of interconnected links, wherein the support member is supported within the interior portion of the headrest bun by the support armature, and further wherein the plurality of interconnected links of the lattice matrix are configured in a pattern providing a stiffness gradient that decreases in stiffness from an inner portion of the lattice matrix to an outer portion of the lattice matrix;
   a receptacle operably coupled to the lattice matrix of the support member within the interior portion of the headrest bun, wherein the receptacle includes an interior cavity; and
   an insert removeably received within the interior cavity of the receptacle.

2. The headrest assembly of claim 1, wherein the plurality of interconnected links of the lattice matrix are configured in a pattern providing a thickness gradient of the plurality of interconnected links that decreases in a thickness of the interconnected links of the plurality of interconnected links from an inner portion of the lattice matrix to an outer portion of the lattice matrix.

3. The headrest assembly of claim 1, wherein the support member includes an attachment bracket operably coupled to the support armature and the lattice matrix.

4. The headrest assembly of claim 3, wherein the lattice matrix and the attachment bracket are comprised of a common material to define the support member as a monolithic structure.

5. The headrest assembly of claim 1, wherein the lattice matrix is deflectable.

6. The headrest assembly of claim 1, wherein the insert includes a metal material.

7. The headrest assembly of claim 1, wherein the insert is a weighted member having a weight in a range of about 30 g to about 500 g.

8. The headrest assembly of claim 1, wherein the plurality of interconnected links includes first and second portions having first and second patterns of interconnected links to thereby define a first set of cells and a second set of cells disposed throughout the first and second patterns of interconnected links, respectively.

9. The headrest assembly of claim 8, wherein the first set of cells of the first portion of the lattice matrix includes cells comprised of a first size, and further wherein the second set of cells of the second portion of the lattice matrix includes cells comprised of a second size that is greater than the first size.

10. The headrest assembly of claim 8, wherein the first pattern of interconnected links includes interconnected links of a first thickness, and further wherein the second pattern of interconnected links includes interconnected links of a second thickness that is greater than the first thickness of the interconnected links of the first pattern.

11. A headrest assembly, comprising:
a headrest bun having an interior portion;
a support armature having a portion thereof disposed within the interior portion of the headrest bun;
a receptacle disposed within the interior portion of the headrest bun and operably coupled to the portion of the support armature disposed within the interior portion of the headrest bun, wherein the receptacle includes an open top portion opening into an interior cavity; and
an insert removeably received within the interior cavity of the receptacle, wherein the insert provides a dynamic damper effect.

12. The headrest assembly of claim 11, wherein the insert is a weighted member having a weight in a range of about 30 g to about 500 g.

13. The headrest assembly of claim 11, wherein the insert includes a metal material.

14. A headrest assembly, comprising:
a headrest bun having an interior portion; and
a plurality of resonators disposed within the interior portion of the headrest bun, wherein each resonator of the plurality of resonators includes a receptacle operably coupled to a deflectable lattice matrix and an insert received within an interior cavity of the receptacle, and further wherein each receptacle of the plurality of resonators is integrated into the deflectable lattice matrix to define monolithic structures.

15. The headrest assembly of claim 14, wherein each deflectable lattice matrix of the plurality of resonators includes a stiffness gradient that decreases in stiffness from an inner portion to an outer portion.

16. The headrest assembly of claim 15, wherein the plurality of resonators includes first and second resonators, and further wherein the first resonator is tuned to a first frequency and the second resonator is tuned to a second frequency that is different than the first frequency.

17. The headrest assembly of claim 16, wherein the first resonator is spaced-apart from the second resonator.

18. The headrest assembly of claim 17, wherein the first and second resonators are both configured to deflect along first and second axes.

* * * * *